US012789191B2

(12) United States Patent
Itabashi et al.

(10) Patent No.: US 12,789,191 B2
(45) Date of Patent: Nov. 10, 2026

(54) DROPLET TRANSPORT DEVICE, ANALYSIS SYSTEM, AND ANALYSIS METHOD

(71) Applicant: Hitachi High-Tech Corporation, Tokyo (JP)

(72) Inventors: Naoshi Itabashi, Tokyo (JP); Michiru Fujioka, Tokyo (JP); Shuhei Yamamoto, Tokyo (JP); Yoshimitsu Yanagawa, Tokyo (JP); Yusuke Goto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 1138 days.

(21) Appl. No.: 17/220,166

(22) Filed: Apr. 1, 2021

(65) Prior Publication Data

US 2021/0316310 A1 Oct. 14, 2021

(30) Foreign Application Priority Data

Apr. 13, 2020 (JP) ................................ 2020-071787

(51) Int. Cl.
*B01L 3/00* (2006.01)

(52) U.S. Cl.
CPC .................. *B01L 3/502792* (2013.01); *B01L 3/502715* (2013.01); *B01L 3/50273* (2013.01);
(Continued)

(58) Field of Classification Search
CPC ......... B01L 3/502792; B01L 3/502715; B01L 3/50273; B01L 2300/0645;
(Continued)

(56) References Cited

U.S. PATENT DOCUMENTS

2015/0306598 A1* 10/2015 Khandros .............. C12M 23/16 204/547
2018/0188230 A1* 7/2018 Huff .................. B01L 3/502761
2022/0001386 A1* 1/2022 Holden ............... B01L 3/50273

FOREIGN PATENT DOCUMENTS

JP 2008090066 A * 4/2008
WO 2017078059 A1 5/2017

OTHER PUBLICATIONS

Kumar et al., Digital Microfluidics and its Integration with a Fluidic Microreactor, Mar. 2013, Journal of ISSS, vol. 2, No. 1, pp. 10-19. (Year: 2013).*

(Continued)

*Primary Examiner* — Shizhi Qian
*Assistant Examiner* — Sommer Yousef Osman
(74) *Attorney, Agent, or Firm* — Miles & Stockbridge, P.C.

(57) ABSTRACT

Provided is a technique for moving all of a droplet from a microchannel in which the droplet have been introduced to another layer.
The droplet transport device of the present disclosure includes a substrate having a through-hole or a recess, a first electrode provided on the substrate along the surface of the substrate and arranged at a position adjacent to the through-hole or the recess, a plurality of second electrodes provided on the substrate along a surface of the substrate and to which a voltage for moving the droplet introduced on the substrate is applied, and a dielectric layer covering the surface of the substrate, the first electrode, and the second electrodes, and a water-repellent film provided on the inner wall surface of the through-hole or the recess, and on the dielectric layer.

2 Claims, 8 Drawing Sheets

(52) U.S. Cl.
CPC .................. *B01L 2300/0645* (2013.01); *B01L 2400/0427* (2013.01)

(58) Field of Classification Search
CPC ..... B01L 2400/0427; B01L 2300/0816; B01L 2300/0838; B01L 2400/0406; B01L 2400/0421; B01L 9/065; B01L 3/502784; G01N 27/44734; G01N 27/44782
See application file for complete search history.

(56) References Cited

OTHER PUBLICATIONS

Kajiwara et al., English translation of JP-2008090066-A, 2008 (Year: 2008).*
Chatterjee et al., Droplet-based microfluidics with nonaqueous solvents and solutions, 2006, Lab on a Chip, 6, 199-206 (Year: 2006).*
Bender et al. "Digital Microfluidic System with Vertical Functionality" Micromachines, Nov. 2015, pp. 1655-1674, No. 6.

* cited by examiner

[FIG. 2]
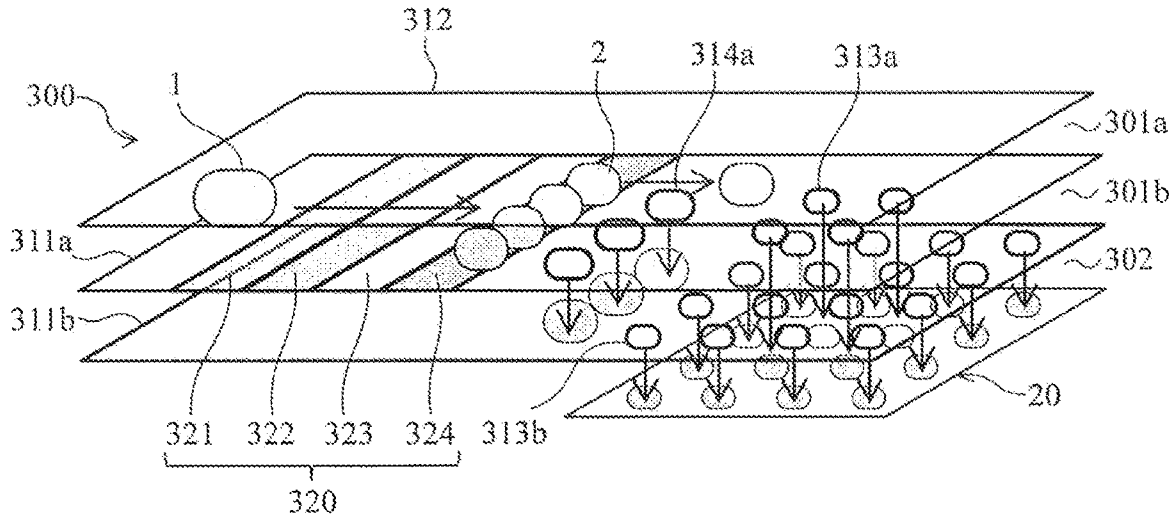

[FIG. 4]
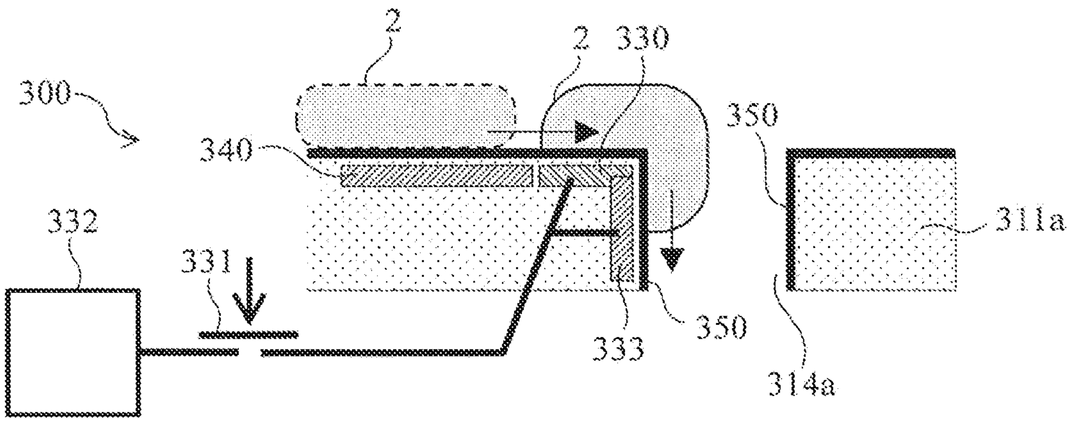

[FIG. 8]
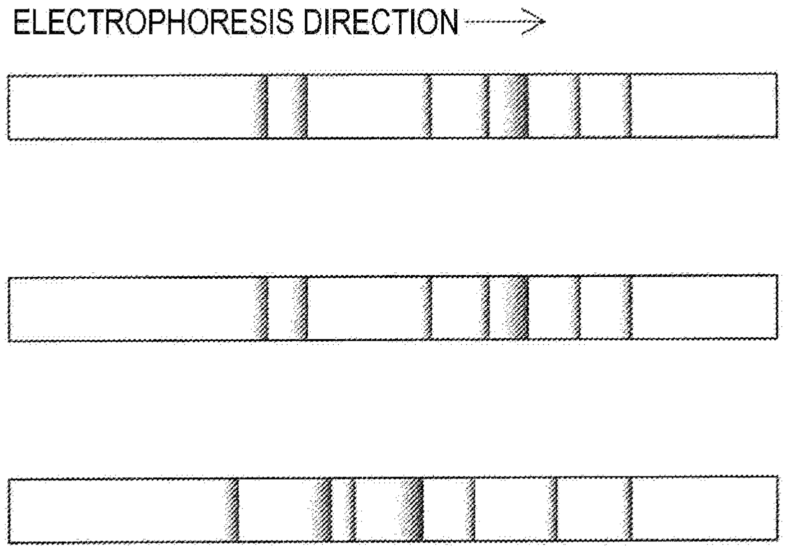

DROPLET TRANSPORT DEVICE, ANALYSIS SYSTEM, AND ANALYSIS METHOD

TECHNICAL FIELD

The present disclosure relates to a droplet transport device, an analysis system, and an analysis method.

BACKGROUND ART

In the analysis of liquid samples such as bioanalysis, it is required to perform the desired analysis using as little sample or reagent as possible. This is not only to reduce the burden of sample collection by keeping the sample collected from the analysis target such as a living body as small as possible but also to use a sample that exists only in a small amount from the beginning, such as criminal evidence, for analysis without waste.

For example, Electro Wetting On Dielectric (EWOD) is attracting attention as a technique for manipulating (transporting, mixing, and the like) a very small amount of liquid of 1 microliter or less on a substrate. In EWOD, a device in which transport control electrodes are arranged on a substrate and a water-repellent treated dielectric is coated on the transport control electrodes is used. Droplets can be controlled by utilizing the phenomenon in which the contact angle of the droplets on the dielectric surface changes by introducing minute droplets onto such a droplet transport device and applying a voltage to the transport control electrode to change the surface energy of the dielectric. Using a droplet transport device makes basic operations possible, for example, such as attracting droplets to a position of an electrode to which a voltage has been applied to transport the droplets, transporting two droplets onto one electrode to mix the droplets, repeatedly moving the mixed droplets by some pathway to stir the mixed droplets, or the like.

In general, the pathway through which the droplets are manipulated often has a form in which an upper substrate covers the pathway from above a lower substrate having the transport control electrode in order to prevent evaporation of the droplet (a form in which the droplet manipulation pathway is sandwiched between the lower substrate and the upper substrate: hereinafter referred to as "microchannel"). In such a microchannel module (droplet transport device), it is useful if an operation, for example, such as that a certain amount of the liquid injected from an opening (hole) provided in the upper substrate is introduced into the microchannel, is possible in addition to the above basic operations, and a method for introducing a droplet into a desired microchannel through a hole is being studied (PTLs 1 and 2 and Non-PTL 1).

In PTL 1, in order to introduce droplets from the outside into the microchannel, disclosed is a configuration in which a hole is made in an upper substrate of the upper substrate and a lower substrate, a liquid is supplied from above the hole, and a part of the liquid can be torn off and introduced into the microchannel as minute droplets. By making the inner wall surface of the hole a hydrophilic surface, some of the droplets larger than the hole can enter the inside of the hole, and the portion that has entered the hole can be torn off by the operation of the electrode and introduced into the channel. In the configuration of PTL 1, it is disclosed that, if the inside of the hole is made water-repellent, droplets larger than the hole cannot enter the hole and cannot be torn off, so that the inside of the hole needs to be hydrophilic.

PTL 2 discloses the configuration in which, a hole is made in an upper substrate of the upper substrate and a lower substrate that sandwich a microchannel, and a part of a relatively large amount of liquid in a microchannel cell can be discharged as minute droplets (see paragraph 0040 and FIG. 8 of this document). PTL 2 discloses the principle: both the inner wall surface of the microchannel and the inner wall surface of the hole remain water-repellent; at the time when the liquid in the microchannel is transported to the position of the hole by the transport control electrode if the surface where the droplets are in contact with is water repellent, the curvature of the droplets will increase; the greater the curvature, the higher the pressure inside the liquid, and thus, some of the liquid in the channel can be pushed upward (discharged) from the hole.

Both PTLs 1 and 2 aim to cut out a part of the original liquid as minute droplets. PTLs 1 and 2 have a difference; in PTL 1, a part of the original liquid (a large amount of liquid) supplied from an external free space is drawn into the microchannel through the hole whose inner wall surface is hydrophilic, on the other hand, in PTL 2, a part of the original liquid (a large amount of liquid) supplied from the closed space sandwiched between the upper substrate and the lower substrate is pushed up from the hole into the free space by the internal pressure of the liquid.

On the other hand, Non-PTL 1 discloses a method of hydrophilizing an inner wall surface of a through-hole from an upper layer to a lower layer when the microchannel has two layers and droplets are moved from the upper layer (Top Layer) to the lower layer (Bottom Layer). When the inner wall surface of the through-hole is water repellent, the liquid does not enter the hole, but the liquid can pass through the hole by making the inner wall surface of the hole hydrophilic. As illustrated in the bottom layer of the Top View illustrated in FIG. 3 of Non-PTL 1, the blue droplet sucked into the hole from the upper layer generally moves to the lower layer, but a part of the droplet is left inside the hole.

CITATION LIST

Patent Literature

PTL 1: International Publication No. 2017/078059

PTL 2: JP-A-2008-090066

Non-Patent Literature

Non-PTL 1: Micromachines 2015, 6(11), 1655-1674

SUMMARY OF INVENTION

Technical Problem

The method of introducing a liquid into a microchannel described in PTL 1 aims to tear off a part of the original liquid having a certain large amount and introduce the liquid into the microchannel. Therefore, in PTL 1, no attention has been paid to transporting all of the droplets from the microchannel to channels located in other layers or analysis devices.

PTL 2 also discloses a technique of discharging a part of the original liquid having a certain large amount as a droplet and using the droplet for transporting a minute object. However, there is no description about transporting all of the droplets from the microchannel to channels located in other layers or analysis devices.

Although Non-PTL 1 discloses a technique for moving a droplet from the upper layer to the lower layer, there is room for improvement in that a part of the droplet remains in a hole.

Therefore, the present disclosure provides a technique for moving all of the droplets from the microchannel where the droplets have been introduced to another layer.

Solution to Problem

In order to achieve the above object, a droplet transport device of the present disclosure includes a substrate having a through-hole or a recess, a first electrode provided on the substrate along a surface of the substrate and arranged at a position adjacent to the through-hole or the recess, a plurality of second electrodes provided on the substrate along the surface of the substrate and to which a voltage for moving a droplet introduced on the substrate is applied, a dielectric layer covering the surface of the substrate, the first electrode, and the second electrodes, and a water-repellent film provided on an inner wall surface of the through-hole or the recess, and on the dielectric layer.

Further features relating to this disclosure will become apparent from the description of the present specification and the accompanying drawings. In addition, the aspects of the present disclosure are achieved and realized by the combination of elements and various elements, the detailed description below, and the aspects of the appended claims.

The description of the present specification is merely a typical example and does not limit the scope of claims or application examples of the present disclosure in any sense.

Advantageous Effects of Invention

According to the droplet transport device of the present disclosure, all of the droplet can be moved from the microchannel in which the droplet has been introduced to another layer.

Problems, configurations, and effects other than the above will be clarified by the following description of the embodiments.

BRIEF DESCRIPTION OF DRAWINGS

FIG. 2 is a schematic perspective view illustrating an analysis system including a droplet transport device according to a first embodiment.

FIG. 4 is a cross-sectional view illustrating another configuration in the vicinity of one hole of the EWOD substrate.

FIG. 8 is a schematic diagram illustrating the results of capillary electrophoresis of nucleic acids.

DESCRIPTION OF EMBODIMENTS

Figure 1A:
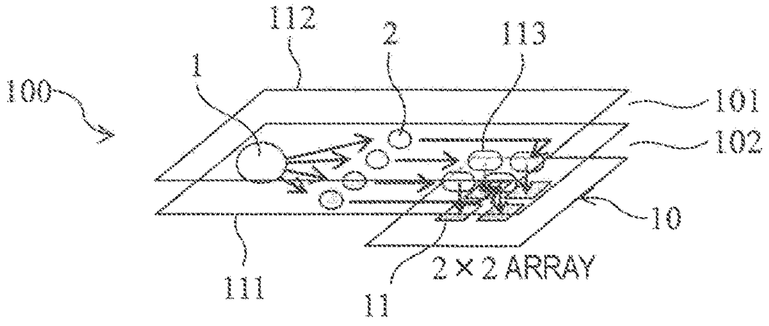
FIGS. 1A to 1C are schematic perspective views illustrating examples of an analysis system including a droplet transport device and an analysis device.

Hereinafter, embodiments of the present disclosure will be described with reference to the accompanying drawings. In the accompanying drawings, functionally the same elements may be displayed with the same reference numerals. The accompanying drawings illustrate specific embodiments and implementation examples in accordance with the principles of the present disclosure, but these are for the purpose of understanding the present disclosure and are not used to construe the present disclosure in a limited manner. That is, it is necessary to understand that the description of the present specification is merely a typical example and does not limit the scope of claims or application examples in any sense.

The various embodiments described below have been described in sufficient detail for those skilled in the art to implement the present disclosure, but other implementations and embodiments are also possible and it is possible to change the configuration and structure and replace various elements without departing from the scope and spirit of the technical ideas of the present disclosure. Therefore, the following description should not be construed as limited thereto.

In each embodiment, as an example of bioanalysis, an example of analyzing nucleic acid is illustrated. However, since the present disclosure is basically related to the control of a droplet when analyzing an analysis target contained in the droplet (whether in a dissolved, suspended, or suspended state), what is contained in the droplet is not limited to nucleic acids, but may be components of blood or other body fluids. Furthermore, the analysis target is not limited to those derived from living organisms such as animals and plants and the techniques of the present disclosure can be similarly applied to the food industry and various industries. The techniques of the present disclosure are applicable as long as the characteristics within the droplet are preserved by a medium (e.g., air or oil) that isolates the droplet from external influences. For example, when a sensor of the analysis device is a pH sensor, it is also applicable to the industrial use to measure the pH of a droplet under the restriction that the substance to be determined for pH in the droplet does not diffuse into air or oil. On the other hand, when the sensor is a temperature sensor, the amount of heat contained in the minute droplets is easily diffused to the outside via air or oil (or heat conduction of the substrate), and thus, the technique of the present disclosure is not suitable for such an application. Even if the analysis target leaks to the isolation medium to some extent, it is possible to estimate the initial characteristics in consideration of the diffusion loss if the speed of the leakage is slow. Since the present disclosure relates only to a technique for controlling a droplet in order to analyze some characteristics of the droplet, any analysis targets can be used as long as the characteristic of the droplet is targeted, under the above-mentioned restrictions.

First Embodiment

<Overview of Droplet Transport>

The present embodiment will describe a droplet transport device (sometimes called a "pretreatment module") and an analysis system using the same, for moving all of the droplet from a layer of an EWOD microchannel, which has been performing operations such as transporting and mixing the introduced droplet, to a layer different therefrom, in a state where minute droplet (specimen droplet, reagent droplet, or the like) is introduced into the EWOD microchannel. It is assumed that the droplet introduced into the microchannel is, for example, a droplet that has been measured at a fixed amount, or a droplet that has been mixed or reacted with a reagent at a predetermined concentration or a predetermined amount. Therefore, it is ideal to utilize all of the droplet when further reacting with another reagent thereafter, or when performing some quantitative analysis thereafter. It is required to use all of the droplet, especially when the liquid should not be wasted at all, such as for a rare droplet such as a specimen that was originally collected in very small amounts, a droplet containing a dilute analysis target substance, and a droplet containing the analysis target with low detection sensitivity in the analysis and for which whether or not to be able to be detected is important.

Before explaining the features of the droplet transport device of the present embodiment, first, in an analysis device including a sensor array in which a plurality of sensors are arranged in a two-dimensional array, an example of a method of supplying droplets to be analyzed from a microchannel located on an upper layer thereof and executing the analysis will be described.

FIG. 1A is a schematic perspective view illustrating an example of an analysis system including a droplet transport device 100 and an analysis device 10. As illustrated in FIG. 1A, the analysis device 10 (sometimes referred to as an "analysis module") has 2×2=4 sensors 11 (sensor array) arranged in an array. The droplet transport device 100 includes an EWOD substrate 111 and an upper substrate 112 facing each other and a microchannel 101 (upper layer) is defined by the EWOD substrate 111 and the upper substrate 112. Further, the EWOD substrate 111 and the analysis device 10 are arranged so as to face each other and a lower layer 102 is defined by the EWOD substrate 111 and the analysis device 10.

Water-repellent films (not illustrated) are provided on the upper surface and the lower surface of the EWOD substrate 111 (the upper surface and the lower surface of the EWOD substrate 111 are water-repellent treated). At least a surface of the upper substrate 112 facing the EWOD substrate 111 (a surface in the microchannel 101) is water-repellent. Since a general technique can be employed as the method for transporting droplets using the EWOD technique, the description and illustration of the transport control electrode and the dielectric layer of the EWOD substrate 111 will be omitted here.

The EWOD substrate 111 is provided with four holes 113 (through-holes) corresponding to the arrangement of the four sensors 11. That is, the holes 113 are arranged substantially directly above the sensor 11. The position of the hole 113 does not have to be exactly directly above the sensor 11 and may be slightly displaced as long as the droplet can be supplied onto the sensor 11 by dropping the droplet from the hole 113. Although FIG. 1A illustrates an example in which the shape of the hole 113 is substantially circular, other shapes may be used.

In the analysis method using the analysis system as described above, first, the droplet transport device 100 and the analysis device 10 as described above are prepared, and a target droplet 1 containing the substance to be analyzed is introduced from an injection port (not illustrated) into the microchannel 101. Then, the target droplet 1 is split into four by the droplet splitting operation by EWOD and four split droplets 2 are obtained. The target droplet 1 may be, for example, a droplet obtained by an operation such as mixing a sample containing an analysis target introduced into the microchannel 101 with a reagent.

Next, the split droplets 2 are placed on each sensor 11 by dropping each of the split droplets 2 from different holes 113 by the droplet transport operation by EWOD. These split droplets 2 can be analyzed simultaneously by the analysis device 10.

Although not illustrated, the spaces other than the droplets in the microchannel 101 and the lower layer 102 are filled with a medium for isolating the droplets from each other. This medium is a fluid (liquid or gas) having a specific gravity smaller than that of droplets and phase-separating from water, such as oil (silicone oil, mineral oil, or the like) and air. As a result, the droplet can fall from the hole 113 provided in the microchannel 101 of the upper layer to the lower layer 102 under the influence of gravity. When the specific gravity of the medium is larger than the specific gravity of the droplet to be transported (fluorine-based oil, or the like), the analysis system is turned upside down so that the droplets can be supplied to the analysis device 10 located in the upper layer from the microchannel 101 located in the lower layer.

In the analysis system of FIG. 1A, as the number of arrays of the sensors 11 of the analysis device 10 is increased, the number of data obtained within the same time increases. For example, when it is necessary to acquire a large amount of data (increase n numbers) by increasing the data acquisition time or increasing the number of data acquisitions in order to improve the accuracy of analysis, if this can be simultaneously performed in parallel by the array, as a result, highly accurate results can be obtained in a short time.

Figure 1B:
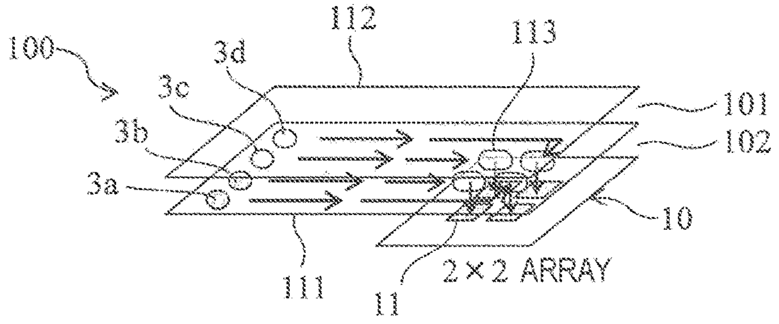

FIG. 1B is a schematic perspective view for illustrating another analysis method using the analysis system illustrated in FIG. 1A. In the analysis method of FIG. 1B, one target droplet is not split by the droplet transport device 100, but four droplets 3*a* to 3*d* containing four different analysis targets are supplied to the analysis device 10 and analyzed at the same time. This quadruples the analysis efficiency.

Note that, when the 2×2=4 sensor arrays illustrated in FIGS. 1A and 1B are used, four droplets can be also supplied by accessing from the peripheral portion of the four sensors 11. Thus, by supplying the droplets from the microchannel 101 in the upper layer to the analysis device 10 in the lower layer through the holes 113 (by transporting the droplets to another layer), the effect of making the droplet transport device 100 compact (reducing the footprint of the pretreatment module) may not be so great.

However, as the number of sensor arrays increases, the effect of making the droplet transport device compact increases. For example, when 4×4=16 sensor arrays are used, if the configuration for transporting droplets to other layers is not used, it is especially difficult to access the four sensors located inside the sensor array and to supply the droplets. In order to reliably supply the droplets to the four inner sensors, it is necessary to widen the pitch of the sensor array and secure a gap as a passage for the droplets. However, widening the pitch of the sensor array hinders the high integration and miniaturization of the analysis device.

Therefore, it is important to arrange the droplets in an array while supplying the droplets from the microchannel located in the upper layer to the analysis device located in the lower layer for compactification.

Figure 1C:
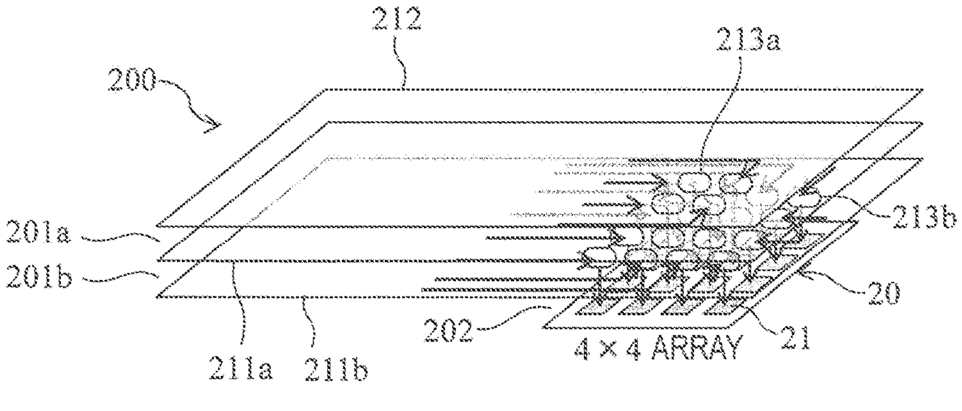

FIG. 1C is a schematic perspective view illustrating an example of another analysis system including a droplet transport device 200 and an analysis device 20. The analysis device 20 has 4×4=16 sensors 21 arranged in an array. The droplet transport device 200 includes EWOD substrates 211*a* and 211*b* and an upper substrate 212. The upper substrate 212 and the EWOD substrate 211*a* define a microchannel 201*a* in the uppermost layer. The EWOD substrates 211*a* and 211*b* define a microchannel 201*b* in the intermediate layer. A bottom layer 202 is defined by the EWOD substrate 211*b* and the analysis device 20.

The EWOD substrate 211*a* is provided with four holes 213*a* (through-holes) located substantially directly above the four (2×2) sensors 21 located in the center of the sensor array. The EWOD substrate 211*b* is provided with 16 holes 213*b* (through-holes) located substantially directly above the 16 sensors 21 of the analysis device 20. With such a configuration, droplets can be dropped from the microchannel 201*a* in the uppermost layer so as to pass through the four holes 213*a* and the four holes 213*b* located in the center of the 16 holes 213*b* and can be supplied onto the four sensors 21 located in the center of the analysis device 20. Further, on the 12 sensors 21 located on the peripheral edge of the sensor array, droplets can be dropped from the microchannel 201*b* of the intermediate layer so as to pass through the holes 213*b* located substantially directly above the 12 sensors 21, whereby the droplets can be supplied. By supplying the droplets in this way, the droplet transport device 200 and the analysis device 20 having a small footprint and compact size can be realized without widening the pitch of the analysis device 20.

As described above, by providing holes in the EWOD substrate constituting the layer of the microchannel and supplying droplets to other layers through the holes, it is possible to be stored in a compact stacking module (analysis system) having a small footprint without widening the pitch between the sensors. As a result, more sensors can be placed in the same footprint, leading to improved data accuracy and improved data acquisition efficiency. Further, by using the droplet transport device having the above configuration, it becomes easy to supply the droplets to each sensor of the analysis device.

Configuration Example of Droplet Transport Device According to Present Embodiment FIG. 2 is a schematic perspective view illustrating an analysis system including a droplet transport device 300 and the analysis device 20 according to the first embodiment. As illustrated in FIG. 2, the configuration of the droplet transport device 300 is almost the same as the configuration of the droplet transport device 200 illustrated in FIG. 1C, but the difference is that an EWOD substrate 311*a* has three holes 314*a* (through-holes) and an operation unit 320 for preparing the split droplets 2 to be supplied to the analysis device 20. The holes 314*a* are arranged along the lateral direction of the EWOD substrate 311*a*. The operation unit 320 includes a transport unit 321, a stirring unit 322, a reaction unit 323, and a splitting unit 324, which are arranged in this order in the direction toward the hole 313*a* (longitudinal direction of the EWOD substrate 311*a*).

The target droplet 1 containing the nucleic acid to be analyzed is supplied to the transport unit 321 and the target droplet 1 is transported to the stirring unit 322 by the droplet operation in the transport unit 321. Although not illustrated, a reagent droplet is transported to the stirring unit 322 from another pathway, and the target droplet 1 and the reagent droplet are mixed and stirred in the stirring unit 322. The mixed droplet is transported to the reaction unit 323. The reaction unit 323 is provided with a temperature control mechanism (not illustrated), and the nucleic acid in the mixed droplet is replicated by moving the mixed droplet on the reaction unit 323. For the replication reaction, PCR that is generally widely used for nucleic acid analysis may be used and in the reaction unit 323, the surface of the EWOD substrate 311*a* is temperature-controlled so that the temperature conditions are suitable for the PCR reaction. After that, the droplet containing the replicated nucleic acid is transported to the splitting unit 324 and is split into four split droplets 2 by the droplet operation in the splitting unit 324.

The configuration of the operation unit 320 can be appropriately changed according to the analysis target and the analysis content. When it is not necessary to control the temperature of the droplets supplied to the analysis device 20 or mix the droplets with a reagent, the operation unit 320 may not be provided.

The configuration of the analysis device 20 is the same as that illustrated in FIG. 1C. As described above, in the present embodiment, as an example, nucleic acid analysis is performed by 4×4=16 sensors arranged in an array. Therefore, 16 droplets corresponding to the number of sensors of the analysis device 20 are transported by the droplet transport device 300. The amount corresponding to 4 droplets out of 16 droplets is ¼ of the original target droplet 1. Therefore, the original target droplet 1 is first split into four by the splitting unit 324, one of the split droplets 2 is left in the microchannel 301*a* of the uppermost layer, and the remaining three split droplets 2 are dropped into the three holes 314*a* and moved to the microchannel 301*b* of the intermediate layer. The split droplet 2 left in the microchannel 301*a* is further split into four on the microchannel 301*a* and supplied from the four holes 313*a* to the analysis device 20 by passing through the holes 313*b* provided in the microchannel 301*b* of the intermediate layer. The three split droplets 2 introduced into the microchannel 301*b* are each split into four droplets (12 in total) on the microchannel 301*b* and are supplied from 12 holes 313*b* out of the 16 holes 313*b* located at the peripheral edge to the analysis device 20 located in the lowermost layer 302, respectively.

In this way, since the split droplet 2 falls from the hole 314*a* and the droplet obtained by further splitting the split droplet 2 falls from the hole 313*a*, the size of the hole 314*a* is formed larger than the size of the hole 313*a*.

<Hole Configuration>

As a result of diligent studies of the present inventors to drop all of the droplets from the holes 313*a* and 314*a* provided in the EWOD substrate 311*a* and the holes 313*b* provided in the EWOD substrate 311*b*, it has been found that it is effective to provide electrodes for drawing droplets on the edges of the holes and to treat the inner wall surfaces of these holes with water repellent treatment.

Figure 3A:
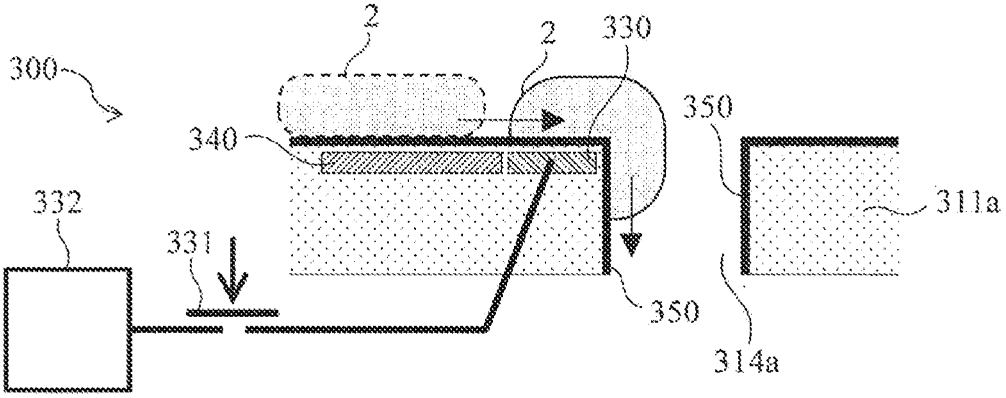
FIG. 3A is a cross-sectional view illustrating a configuration in the vicinity of one hole of an EWOD substrate.

FIG. 3A is a cross-sectional view illustrating a configuration in the vicinity of one hole 314*a* of the EWOD substrate 311*a*. Hereinafter, only the hole 314*a* of the EWOD substrate 311*a* illustrated in FIG. 3A will be described as a representative. Note that, the following description also applies to the hole 313*a* of the EWOD substrate 311*a* and the hole 313*b* of the EWOD substrate 311*b*.

As illustrated in FIG. 3A, the EWOD substrate 311*a* includes a pull-in electrode 330 (first electrode) provided adjacent to the hole 314*a* and transport control electrodes 340 (a plurality of second electrodes) for transporting the split droplet 2 by EWOD. The pull-in electrode 330 and the transport control electrode 340 are arranged along the upper surface of the EWOD substrate 311*a*. In reality, the EWOD substrate 311*a* is formed such that the pull-in electrode 330 and the transport control electrode 340 are arranged on the substrate, a dielectric layer is provided so as to cover those electrodes, and a water-repellent film 350 is provided on the dielectric layer, but the illustration is omitted for the sake of simplicity.

The pull-in electrode 330 is connected to a power supply 332 by wiring. The application of the voltage to the pull-in electrode 330 can be switched on or off by operating a contact switch 331 provided in the middle of the wiring. The contact switch 331 may be switched manually or automatically. When the contact switch 331 is automatically controlled, for example, a switch drive mechanism (not illustrated) and a controller (not illustrated) for controlling the switch drive mechanism and the power supply 332 are provided, and the application of the voltage to the pull-in electrode 330 can be controlled by the controller. The contact switch 331 is controlled to be turned on at least when the droplet reaches the pull-in electrode 330. Similarly, the transport control electrode 340 is also connected to a power source for applying the EWOD control voltage by wiring.

The water-repellent film 350 is provided on the upper surface of the EWOD substrate 311*a* (that is, on the dielectric layer) and the inner wall surface of the hole 314*a*. A water-repellent film (not illustrated) is also provided on the lower surface of the EWOD substrate 311*a*. Since the inner wall surface of the hole 314*a* is water-repellent in this way, all of the split droplet 2 can be transported to the lower layer (microchannel 301*b* of the intermediate layer) without leaving a part of the split droplet 2 inside the hole 314*a*. As the water-repellent film 350, a known water-repellent material such as a fluororesin such as polytetrafluoroethylene or a silicone resin can be used.

FIG. 3A illustrates an example in which the holes 314*a* are provided perpendicular to the surface of the EWOD substrate 311*a* but the shape of the holes 314*a* is not limited thereto. For example, the upper end portion of the hole 314*a* may be processed into a tapered shape (a shape in which the upper end portion of the hole 314*a* is rounded). The hole 314*a* can be formed and processed by, for example, machining, molding, etching, or the like, depending on the material and characteristics of the EWOD substrate 311*a*.

<Area of Electrode>

The contact area of the split droplet 2 with respect to the EWOD substrate 311*a* may be an area that can contact two adjacent transport control electrodes 340 when an EWOD control voltage is applied to the transport control electrodes 340. The contact area of the split droplet 2 with respect to the EWOD substrate 311*a* may occupy an area larger than the area of one transport control electrode 340, or may cover a plurality of transport control electrodes 340. In other words, the size (volume) of the split droplet 2 can be determined so as to have the above-mentioned contact area according to the area of the transport control electrode 340.

By setting the area of the pull-in electrode 330 to ½ or less of the area of the transport control electrode 340, the split droplet 2 can be easily introduced into the hole 314*a*. At this time, the contact switch 331 is in the ON state. FIG. 3A illustrates a configuration in which the area of the pull-in electrode 330 is set to about ½ of the area of the transport control electrode 340. As illustrated in FIG. 3A, since the area of the pull-in electrode 330 is about ½ of the area of the transport control electrode 340, apart of the split droplet 2 protrudes toward the hole 314*a*. The gravity and surface tension due to the water-repellent film 350 are applied to this part of the split droplet 2, the entire split droplet 2 can be drawn into the hole 314*a*.

Figure 3B:
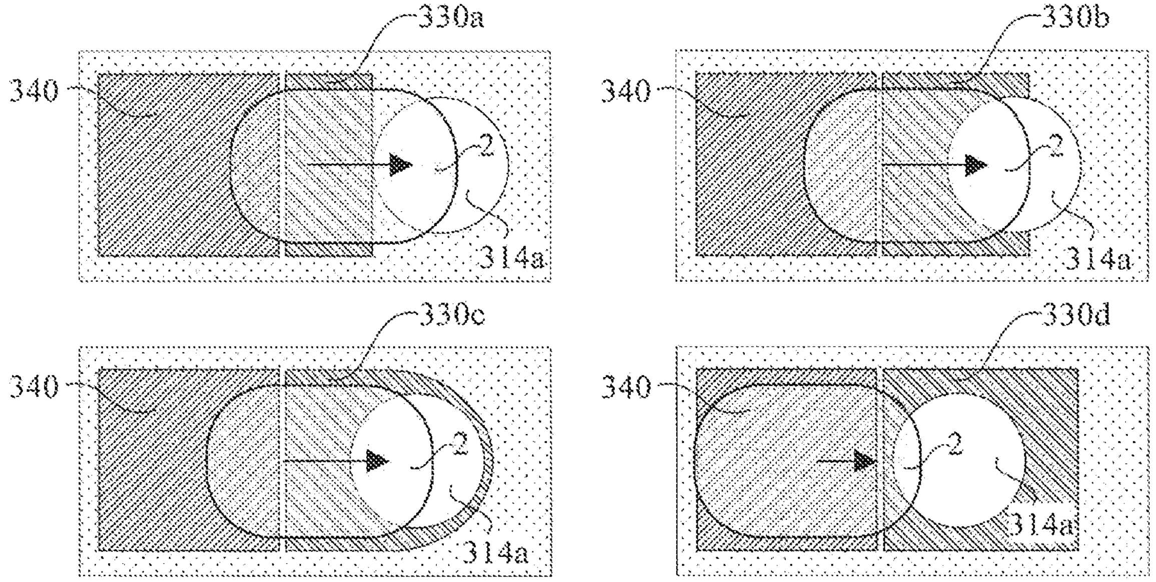
FIG. 3B is a plan view illustrating the configuration in the vicinity of one hole of the EWOD substrate.

FIG. 3B is a plan view illustrating a configuration in the vicinity of one hole 314*a* of the EWOD substrate 311*a*. FIG. 3B illustrates four types of examples (pull-in electrodes 330*a* to 330*d*) in which the pull-in electrode 330 is viewed from above. The pull-in electrode 330*a* has a width of about ½ of the width of the transport control electrode 340. As described above, the split droplet 2 can be introduced into the hole 314*a* by the pull-in electrode 330*a*. Alternatively, for example, even when a pull-in electrode 330*b* having a shape slightly surrounding the hole 314*a* or a pull-in electrode 330*c* surrounding the hole 314*a* in a ring shape is used, the split droplet 2 can be smoothly drawn into the hole 314*a*. As described above, it is appropriate that the pull-in electrode 330 is as small as about ½ of the transport control electrode 340. Strictly speaking, smoother pull-in can be realized by devising the shape. Note that, the pull-in electrode 330 having an area of about ½ of that of the transport control electrode 340 is still effective. Since the pull-in electrode 330 is for giving an action of pulling the droplet of the transport control electrode 340 into the hole 314*a*, a configuration is effective in which the pull-in electrode 330 is arranged next to the transport control electrode 340 as in the pull-in electrodes 330*a* to 330*c*, and the hole 314*a* is at the tip of the pull-in electrode. If the width of the electrode on the transport control electrode 340 side (left side of the hole 314*a*) is too narrow like the pull-in electrode 330*d*, a sufficient pull-in force is not generated and it is difficult to enter the hole 314*a*. The pull-in electrode 330*d* has a certain electrode area on the other side of the hole 314*a* (the right side of the hole 314*a*), but since it is located on the other side of the hole 314*a*, it does not sufficiently contribute to the pull-in.

As described above, it has been described that it is effective to provide the pull-in electrode 330 adjacent to the hole 314*a* in order to drop the split droplet 2 to the lower layer. Further, it will be described below that the pull-in electrode can be provided not only on the surface of the EWOD substrate but also along the inner wall surface of the hole.

FIG. 4 is a cross-sectional view illustrating another configuration in the vicinity of one hole 314*a* of the EWOD substrate 311*a*. As illustrated in FIG. 4, in this configuration example, a pull-in electrode 333 (third electrode) along the inner wall surface of the hole 314*a* is provided in addition to the configuration illustrated in FIG. 3A. That is, the pull-in electrode 333 is provided on the EWOD substrate 311*a* so as to face the hole 314*a* via the water-repellent film 350 in parallel with the inner wall surface of the hole 314*a*. The position of the pull-in electrode 333 (distance between the inner wall surface of the hole 314*a* and the pull-in electrode 333) is not particularly limited as long as the surface energy on the inner wall surface of the hole 314*a* can be changed.

The size of the pull-in electrode 333 in the direction parallel to the inner wall surface of the hole 314*a* is not limited, but by increasing the size of the pull-in electrode 333, in particular, by providing the pull-in electrode 333 over the entire length of the inner wall surface of the hole 314*a*, the split droplet 2 can be more easily drawn into the hole 314*a*. Although FIG. 4 illustrates a configuration in which the pull-in electrode 330 and the pull-in electrode 333 are in contact with each other, these pull-in electrodes may be arranged apart from each other.

By making an area of the pull-in electrode 333 along the inner wall surface of the hole 314*a* larger than the area of the pull-in electrode 330 along the surface of the EWOD substrate 311*a*, the split droplet 2 can be more easily drawn into the hole 314*a*. FIG. 4 illustrates a configuration in which the area of the pull-in electrode 333 is larger than the area of the pull-in electrode 330.

When the pull-in electrode 333 is provided, even if the area of the pull-in electrode 330 is larger than ½ of the area of the transport control electrode 340, the split droplet 2 can be easily drawn into the hole 314*a*.

From the above, the area of the pull-in electrode 330 is set to ½ or less of the area of the transport control electrode 340, and the area of the pull-in electrode 333 is made larger than the area of the pull-in electrode 330, whereby the introduction of the split droplet 2 into 314*a* can be ensured.

<Application of Voltage>

The present inventors examined the application of voltage to the pull-in electrode 330 in order to introduce all of the split droplet 2 into the hole 314*a*. As a result, it has been found that the split droplet 2 can be drawn into the hole 314*a* by continuously applying a voltage to the pull-in electrode 330 until the split droplet 2 reaches the hole 314*a*.

If a high voltage (for example, 30 V to 100 V) is continuously applied to the pull-in electrode 330, the split droplet 2 may be trapped in the hole 314*a*. Therefore, after being trapped, the split droplet 2 can be dropped from the hole 314*a* by turning off the contact switch 331 to stop the voltage application.

Further, it has been found that in any voltage range in which the split droplet 2 can be moved, after applying a voltage to the pull-in electrode 330, when the voltage is continuously applied until the split droplet 2 reaches the about ½ position of the distance between the center of the transport control electrode 340 adjacent to the pull-in electrode 330 and the center of the upper end of the hole 314*a*, and the application of the voltage is stopped thereafter, the split droplet 2 can be reliably introduced into the hole 314*a*.

As described above, the split droplet 2 can be introduced into the hole 314*a* by turning on the application of the voltage to the pull-in electrode 330 for a certain period of time and then turning off (GND) the voltage application.

<Hole Size>

When the planar shape of the hole 314*a* is substantially circular, by making the diameter of the hole 314*a* larger than the diameter of the split droplet 2 (the diameter calculated by assuming a sphere from the volume of the split droplet 2), the split droplet 2 is drawn into the hole 314*a* so as to slide down. When the diameter of the hole 314*a* is made smaller than the diameter of the split droplet 2, the split droplet 2 becomes difficult to enter because the inner wall surface of the hole 314*a* is water repellent. In this case, by increasing the voltage applied to the pull-in electrode 330 (for example, 30 V to 100 V), the split droplet 2 can be deformed and enter the hole 314*a*. Note that, it is presumed that the viscosity of the split droplet 2 and the restriction of the voltage value so as not to cause dielectric breakdown occur.

<Technical Effect>

As described above, in the droplet transport device according to the first embodiment, the EWOD substrate has a hole for supplying the droplet to the lower layer and the inner wall surface of the hole is treated with water repellent treatment. In addition, the EWOD substrate includes a pull-in electrode at a position adjacent to the hole. With such a configuration, all of the droplet can be supplied to the lower layer through the holes without leaving a part of the droplet on the EWOD substrate. Therefore, when arranging the analysis device having the sensor array under the EWOD substrate, it is not necessary to widen the pitch between the sensors to provide the droplet passage. As a result, since the array can be densely integrated on a small footprint, the droplet transport device and the analysis device can be miniaturized and analysis can be performed with high throughput.

Second Embodiment

In the first embodiment, an analysis system for performing analysis by supplying droplets from a droplet transport device provided with holes in the EWOD substrate to a sensor array located in a lower layer has been described. The droplet transport device is not limited to the sensor array and can be used in combination with an analysis device having another configuration. Therefore, in a second embodiment, an analysis system for supplying a droplet from the droplet transport device to a nanopore device for analyzing nucleic acid will be described. As the droplet transport device used in this embodiment, the same droplet transport device 300 as illustrated in FIG. 2 will be employed and the description thereof will be omitted.

Figure 5A:
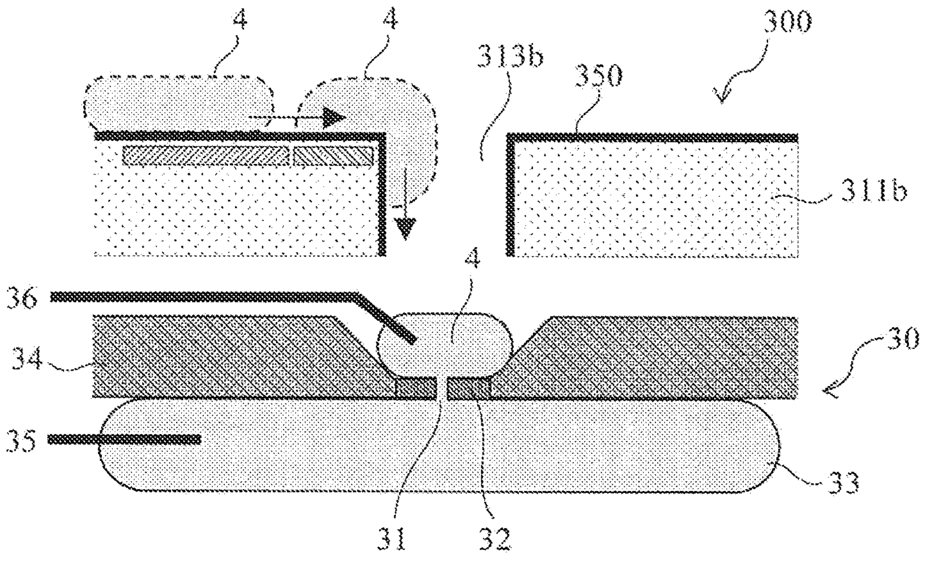
FIG. 5A is a cross-sectional view illustrating a state in which droplets are supplied from a droplet transport device to a nanopore device.

FIG. 5A is a cross-sectional view illustrating a state in which droplets are supplied from the droplet transport device 300 to a nanopore device 30 (analysis device). The configuration of the droplet transport device 300 is the same as that of the droplet transport device 300 of the first embodiment illustrated in FIG. 2. FIG. 5A illustrates the vicinity of one hole 313*b* of the EWOD substrate 311*b* constituting the intermediate layer of the droplet transport device 300. A droplet 4 supplied from the intermediate layer to the nanopore device 30 in the lowermost layer is obtained by splitting each of the above-mentioned four split droplets 2 into four. As described above, the nucleic acid contained in one target droplet 1 is amplified by the operation unit 320, then split into four split droplets 2, which are further split into four droplets 4, respectively. Therefore, the obtained 16 droplets 4 contain the same nucleic acid.

The nanopore device 30 includes a substrate 34 on which a membrane 32 having pores 31 is formed, an upper electrode 36, and a lower electrode 35. The membrane 32 has a thickness on the order of nanometers, for example, and the pores 31 are formed on the order of nanometers. The substrate 34 has a tapered shape around the membrane 32 on the upper surface thereof and can hold the droplet 4 that has fallen from the hole 313*b*. Since the periphery of the droplet 4 is filled with a fluid that is phase-separated from the droplet, the droplet 4 itself constitutes a liquid tank (first liquid tank). In the nanopore device 30, a second liquid tank is formed on the lower surface side of the substrate 34, and the second liquid tank holds an aqueous electrolyte solution 33. The upper electrode 36 comes into contact with the droplet 4 constituting the first liquid tank, and the lower electrode 35 comes into contact with the aqueous electrolyte solution 33 supplied to the second liquid tank. The current flowing between the upper electrode 36 and the lower electrode 35 is measured by an ammeter (not illustrated). When the nucleic acid molecule in the droplet 4 passes through the pore 31, the current changes according to the base sequence of the nucleic acid molecule, so that the base sequence can be decoded from the characteristics of this change.

Although only one channel is illustrated in FIG. 5A, it is assumed that the substrate 34 is provided with 4×4=16 membranes 32 in an array to form 16 channels. The droplet transport device 300 and the nanopore device 30 are arranged so that the holes 313*b* of the EWOD substrate 311*b* are located substantially directly above the membrane 32, respectively. As described above, since the 16 droplets 4 contain the same sample, the same data can be acquired simultaneously on 16 channels. For example, when comparing with the case where the signal output from the ammeter is weak and the data with uncertainty is repeatedly acquired 16 times, the data acquisition efficiency is improved 16 times.

Figure 5B:
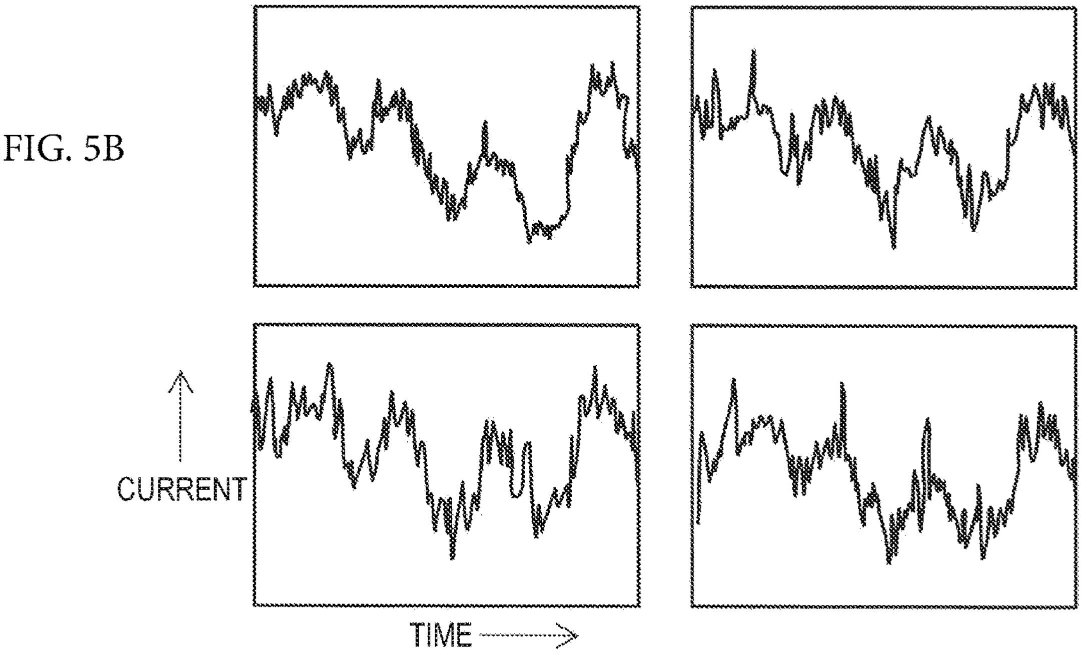
FIG. 5B is a diagram illustrating current waveforms obtained from four channels of the nanopore device.

FIG. 5B is a diagram illustrating current waveforms obtained from 4 channels out of the 16 channels of the nanopore device 30. As illustrated in FIG. 5B, although noise is observed in the current waveforms, the current waveforms of the four channels show the same behavior and show some features of the same base sequence.

In order to actually decode the base sequence of nucleic acid, when data is acquired only with a one-channel sensor (nanopore device), the most probable waveform can be clarified by acquiring a large number of data of nucleic acid molecules having the same sequence and analyzing the plurality of data. On the other hand, in the above-mentioned 16-channel multi-array measurement, 16 series of data can be acquired at the same time, and the data can be efficiently acquired and the accuracy of decoding can be improved from the analysis. If the noise of the signal obtained from one channel is reduced to make the data clearer with technological progress, and thus, the data on one channel is sufficient to decode the base sequence, it is needless to say that the 16 channels can be used to acquire data from different base sequences. In that case, the target droplet 1 containing the replicated nucleic acid molecules of the same sequence is not split into 16 in the droplet transport device 300 as described with reference to FIG. 2, but the 16 types of droplets may be subjected to pretreatment (mixing or reaction with a reagent, or the like) with the same method and supplied to a 16-channel array sensor. The concept is the same as that illustrated in FIG. 1B as an example when four droplets are used.

Technical Effect

As described above, the second embodiment described the method in which the droplet 4 is supplied from the droplet transport device 300 to each channel of the multi-array nanopore device 30, and the base sequence of the nucleic acid is analyzed. Similar to the first embodiment, the inner wall surfaces of the holes 313*a* and 215*a* provided in the EWOD substrate 311*a* of the droplet transport device 300 and the inner wall surface of the hole 313*b* provided in the EWOD substrate 311*b* are water-repellent and the pull-in electrode 330 for drawing the droplet into these holes is provided. As a result, droplets can be easily and reliably supplied to each channel of the nanopore device 30, and thus, the efficiency and accuracy of analysis can be improved.

Third Embodiment

In the first and second embodiments, a droplet transport device for supplying droplets from a hole provided in a microchannel to a sensor array (analysis device) located in a lower layer has been described. As the analysis device that performs analysis using droplets to be analyzed, not only those mounted on a plane such as a sensor array, but also analysis devices having other geometric shapes such as a cylindrical tubular capillary array are widely used. Therefore, in a third embodiment, a droplet transport device capable of delivering droplets to the capillary array analysis device is proposed.

Figure 6A:
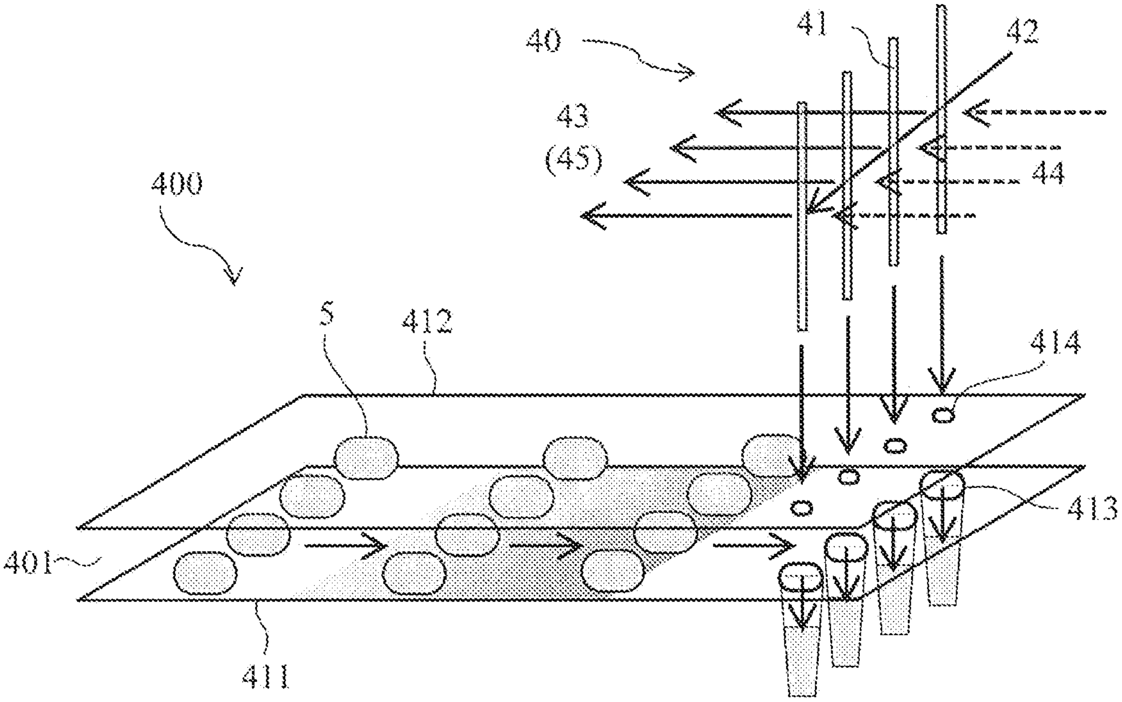
FIG. 6A is a schematic perspective view illustrating an analysis system including a droplet transport device according to a third embodiment.

FIG. 6A is a schematic perspective view illustrating an analysis system including a droplet transport device 400 and an analysis device 40 according to the third embodiment. As illustrated in FIG. 6A, the droplet transport device 400 includes an EWOD substrate 411 and an upper substrate 412 facing each other, and a microchannel 401 is defined by the EWOD substrate 411 and the upper substrate 412.

The EWOD substrate 411 is provided with four wells 413 (recesses) for trapping droplets 5. The wells 413 are arranged along the lateral direction of the EWOD substrate 411. The upper substrate 412 is provided with four holes 414 located substantially directly above the wells 413.

The analysis device 40 includes four capillaries 41, a light source that emits excitation light 42 in the arrangement direction of the capillaries 41 (not illustrated), a detector that detects fluorescence 43 emitted from the capillaries 41 (not illustrated), and other necessary optical systems. When such an analysis device 40 is used, the droplet 5 containing a fluorescence-labeled analysis target can be introduced into the capillary 41 and irradiated with excitation light 42 to detect the fluorescence 43 from the analysis target for analysis. It is also possible to irradiate the capillary 41 with incident light 44 and measure its absorption 45 (transmitted light).

When performing analysis using the droplet transport device 400 and the analysis device 40 of the present embodiment, first, necessary operations such as mixing and reaction with a reagent are performed on the droplet 5 containing the analysis target in the microchannel 401 or outside the microchannel 401, and the droplet 5 is transported to the well 413 and dropped by the operation on the EWOD substrate 411. After that, the capillary 41 is inserted into the hole 414 and introduced into the well 413. As a result, the droplet 5 can be delivered into the capillary 41.

The number of wells 413 is not limited to four and the columns of wells 413 are not limited to one column. For example, the arrangement of the wells 413 may be an array arrangement of a plurality of rows×a plurality of columns as long as the pitch of the capillary 41 introduced into the well 413 does not need to be widened.

Figure 6B:
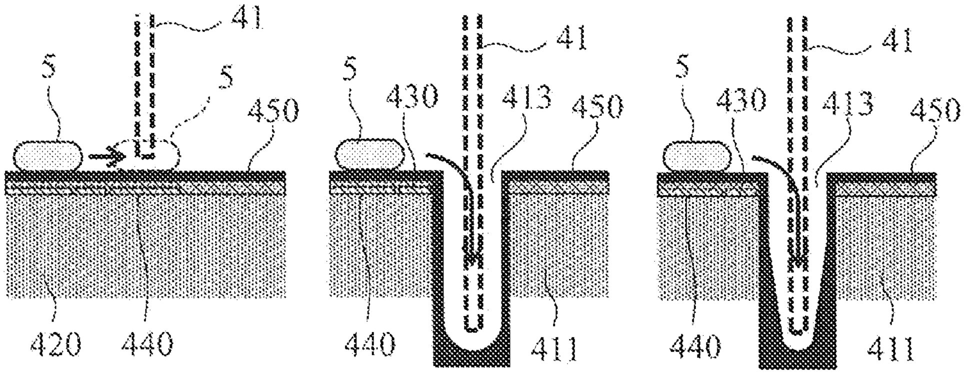
FIG. 6B is a cross-sectional view illustrating the analysis system including the droplet transport device according to the third embodiment.

FIG. 6B is a schematic cross-sectional view illustrating how the droplet 5 is introduced into the capillary 41. In FIG. 6B, only the vicinity of the tip portion of one capillary 41 is illustrated. Further, the illustration of the upper substrate 412 is omitted. When the droplet 5 is sucked into the capillary 41 and electrophoresed, a voltage is applied to the tip of the capillary 41 to form an electric field.

The left diagram of FIG. 6B illustrates a configuration in which the droplet 5 is transported to the tip portion of the capillary 41 on the EWOD substrate 420 (on a water-repellent film 450) having no well 413 and sucked up. In such a configuration, a transport control electrode 440 of the EWOD substrate 420 and the tip of the capillary 41 are in close proximity to each other in a geometrical arrangement. On the other hand, by increasing the distance between the transport control electrode 440 and the tip of the capillary 41, it is possible to prevent damage to the droplet transport device 400 and the capillary 41 due to dielectric breakdown. Therefore, as illustrated in the center diagram and the right diagram of FIG. 6B, the influence of the transport control electrode 440 can be reduced by temporarily dropping the droplet 5 into the well 413 and then sucking the droplet 5 into the capillary 41.

Further, in the configuration illustrated on the left diagram of FIG. 6B, since the droplet 5 has a flat shape sandwiched between the upper substrate 412 and the EWOD substrate 420, it is not easy to suck up the droplet 5 by the capillary 41. The right diagram of FIG. 6B illustrates a forward taper shape in which the well 413 narrows toward the bottom. With such a shape, the droplet 5 can be collected at the center of the tip of the capillary 41. Further, since the well 413 is tapered toward the bottom, the height of the droplet 5 contained in the bottom of the well 413 is higher than that when the diameter of the well 413 is uniform (in the center diagram of FIG. 6B). Therefore, it can be said that the introduction of the droplet 5 into the capillary 41 becomes easier.

The inner wall surface and the bottom surface of the well 413 are formed by the water-repellent film 450, but only the inner wall surface may be composed of the water-repellent film 450. The well 413 is provided with the water-repellent film 450 so as to form a through-hole or a recess in the EWOD substrate 411, for example, by etching or dielectric breakdown according to the material and characteristics of the EWOD substrate 411, and then to form the bottom of the through-hole. Alternatively, the well 413 can be formed by providing the water-repellent film 450 on the inner wall surface of the recess, or on the inner wall surface and the bottom surface thereof.

In the center diagram and the right diagram of FIG. 6B, the depth of the well 413 is larger than the thickness of the EWOD substrate 411, but the depth of the well 413 is not limited thereto and the depth of the well 413 may be less than or equal to the thickness of the EWOD substrate 411.

The analysis system for performing analysis by combining the droplet transport device 400 that introduces the droplet 5 into the well 413 and the analysis device 40 including the capillary 41 for electrophoresis has been described above. On the other hand, for example, adopting a configuration (pretreatment module+electrophoresis tube integrated mounting type module) having a structure in which a capillary is built on a flat substrate and in which light is incident from the top, bottom, left, and right of the substrate to perform observation may not be impossible. However, for example, when analyzing a nucleic acid as a sample, cross-contamination in the pretreatment module must be strictly prohibited. For example, when the pretreatment involves a nucleic acid replication reaction such as PCR (polymerase chain reaction), there is a risk that even a very small amount of nucleic acid not to be analyzed will be replicated and the analysis result will be completely wrong. To avoid this, the pretreatment module can be disposable. On the other hand, since nucleic acid replication does not occur in the electrophoresis tube used for analysis, the electrophoresis tube can be used repeatedly by washing the electrophoresis tube and resetting the history. For these reasons, it is not a good idea from the viewpoint of analysis cost to integrally mount a high-cost electrophoresis tube on a disposable pretreatment module and dispose of the electrophoresis tube, which is a precision optical component, every time. Therefore, like the droplet transport device 400 of the present embodiment, a method of delivering droplets from a disposable pretreatment module manufactured at a low manufacturing cost to a reusable electrophoresis tube can be adopted.

<Configuration of Wells>

Figure 7A:
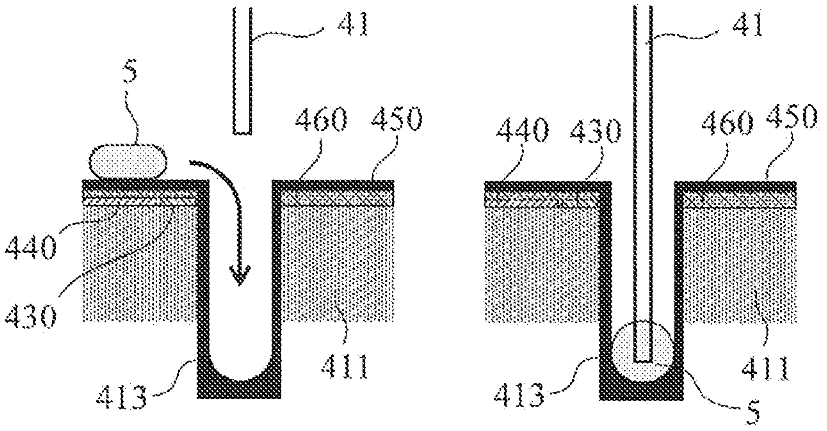
FIGS. 7A and 7B are cross-sectional views illustrating a configuration in the vicinity of one well of an EWOD substrate.

FIG. 7A is a cross-sectional view illustrating a configuration in the vicinity of one well 413 of the EWOD substrate 411. The left diagram of FIG. 7A illustrates a state before the droplet 5 is dropped into the well 413, and the right diagram illustrates a state in which the droplet 5 has been dropped into the well 413. As illustrated in FIG. 7A, the bottom of the well 413 can be curved.

As illustrated in FIG. 7A, the EWOD substrate 411 includes a pull-in electrode 430 provided adjacent to the well 413 and a transport control electrode 440 for transporting the droplet 5 by applying an EWOD control voltage. The pull-in electrode 430 and the transport control electrode 440 are arranged along the upper surface of the EWOD substrate 411. In the example illustrated in FIG. 7A, the pull-in electrode 430 is not provided inside the well 413, and the area of the pull-in electrode 430 is about ½ of the area of the transport control electrode 440. The wiring, power supply, and contact switch for applying a voltage to the pull-in electrode 430 are the same as those in the first embodiment (FIGS. 3A and 3B). Further, the EWOD substrate 411 may be provided with a pull-in electrode (third electrode) (not illustrated) along the inner wall surface of the well 413.

A dielectric layer 460 is provided on the upper surface of the EWOD substrate 411 and the water-repellent film 450 is further provided on the upper surface thereof. The water-repellent film 450 is also provided on the inner wall surface and the bottom surface of the well 413.

<Introduction of Droplet into Capillary>

As illustrated in the left diagram of FIG. 7A, first, the droplet 5 is dropped into the well 413. At this time, as described in the first embodiment, the droplet 5 can be drawn into the well 413 by applying a voltage to the pull-in electrode 430 for a certain period of time. Since the inner wall surface of the well 413 is water-repellent up to the bottom, the droplet 5 can reach the bottom without stopping on the inner wall surface in the middle of the well 413. Further, since the bottom of the well 413 is curved, the droplet 5 can be contained in the center of the bottom of the well 413.

In order to drop the droplet 5 to the bottom of the well 413, the water-repellent film 450 may be provided on at least the inner wall surface. That is, the bottom of the well 413 may be a hydrophilic surface.

After introducing the droplet 5 into the well 413, the capillary 41 is inserted into the well 413 as illustrated in the right diagram of FIG. 7A. The material of the capillary 41 is typically glass and the tip surface is a hydrophilic surface. Therefore, by bringing the droplet 5 into contact with the tip portion of the capillary 41, the capillary 41 can reliably access the droplet 5.

For example, even when the tip surface of the capillary 41 remains hydrophilic and the outer surface is water-repellent treated with a resin coating, the tip surface of the capillary 41 can come into contact with the droplet 5. Although the shape of the meniscus of the droplet 5 with respect to the outer surface is different from the case where the outer surface of the capillary 41 is also hydrophilic, the droplet 5 can be easily sucked into the capillary 41 by appropriately adjusting the forward taper shape inside the well 413, the diameter of the bottom of the well 413, the amount (height) of the droplet 5 to be introduced into the well 413, and the like.

Figure 7B:
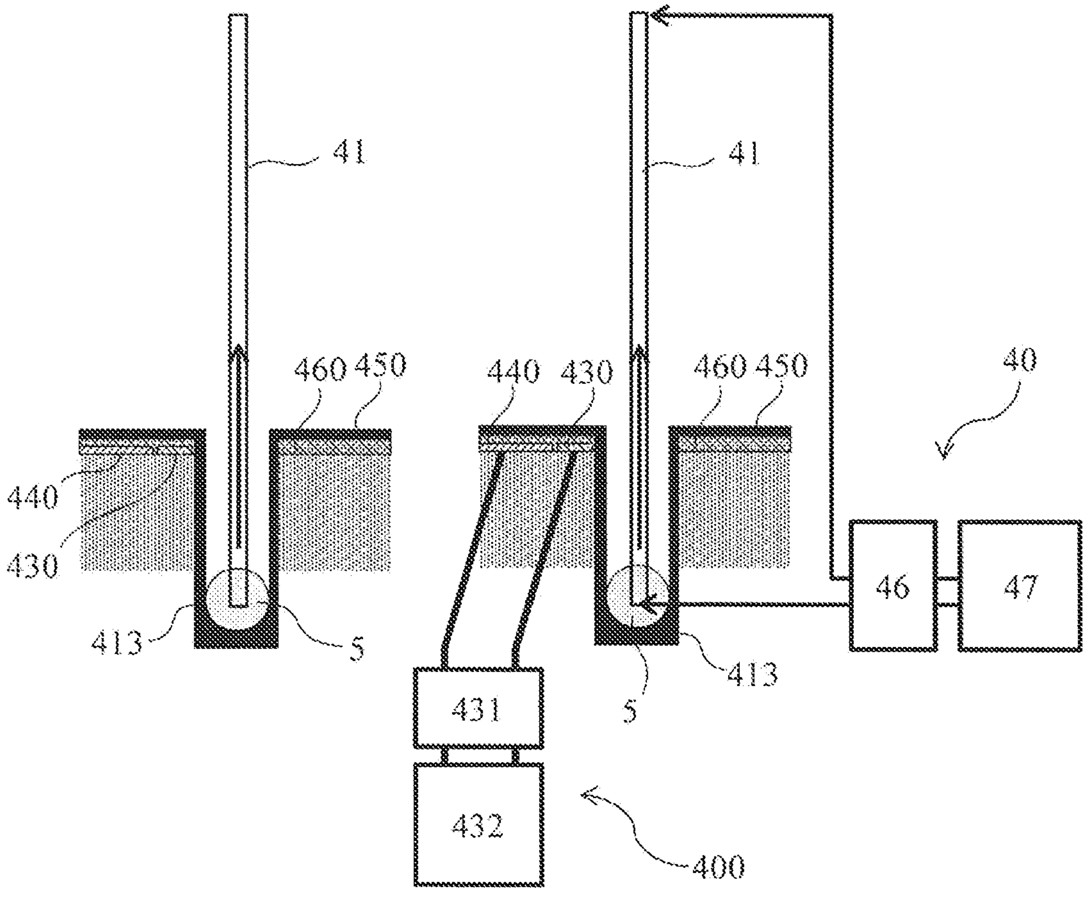

FIG. 7B is a cross-sectional view for illustrating a method of sucking the droplet 5 into the capillary 41. As illustrated in the left diagram of FIG. 7B, by immersing the capillary 41 in the droplet 5, for example, it can be used for general chromatography analysis.

On the other hand, when electrophoresis (the substance in the droplet 5 is electrophoresed and analyzed in the capillary 41 by an electric field) is used, as illustrated in the right diagram of FIG. 7B, the analysis device 40 is provided with wiring, a cutoff switch 46, and a power supply 47 for applying a voltage to both ends of the capillary 41. Further, the droplet transport device 400 is provided with wiring, a power supply 432, and a cutoff switch 431 for applying a predetermined voltage to the pull-in electrode 430 and the transport control electrode 440, respectively.

For example, when a potential difference of 10 kV is provided between the tip portion and the upper end portion of the capillary 41, −10 kV can be applied to the tip portion to make the upper end portion GND, or the tip portion can be made GND by applying 10 kV to the upper end portion. How to apply the voltage can be appropriately selected according to the design. For example, when a configuration in which the upper end portion is electrophoresed as GND is preferable in terms of design, in consideration of the breakdown voltage (breakdown distance with respect to 10 kV) of the medium (fluid) isolating the droplet 5, design requirements such as providing a sufficient distance between the tip of the capillary 41, and the transport control electrode 440 and the pull-in electrode 430 by increasing the depth of the well 413 provided on the EWOD substrate 411 or increasing the opening diameter of the well 413 are required. As described above, since the droplet 5 can be easily introduced into the well 413 by making the diameter of the droplet 5 smaller than the diameter of the well 413, there is no problem in pulling in the droplet 5 even if the well 413 is designed to be large. Further, since the water-repellent film 450 is provided on the inner wall surface of the well 413, the droplet 5 reaches the bottom of the well 413 even when the well 413 becomes deep. The design of the depth and diameter of the well 413 also depends on the dielectric breakdown strength of the droplet isolation medium (fluid) used.

Further, the dielectric breakdown of the pull-in electrode 430 and the transport control electrode 440 can be prevented by switching between the application of the voltage to the electrodes and the application of the voltage to the capillary by using the cutoff switches 431 and 46 having a high withstand voltage. The switching of the cutoff switches 431 and 46 and the control of the power supplies 432 and 47 can be executed by a controller (not illustrated). The controller controls the cutoff switch 46 to be turned off so that no voltage is applied to both ends of the capillary 41 until the droplet 5 is introduced into the well 413. Further, when a voltage is applied to both ends of the capillary 41, the cutoff switch 431 is controlled to be turned off.

<Nucleic Acid Electrophoresis>

FIG. 8 is a schematic diagram illustrating the results of capillary electrophoresis of nucleic acids using the analysis system (FIGS. 6A and 6B) according to the present embodiment. The left diagram and the center diagram of FIG. 8 illustrate that the nucleic acid profiles of two samples among the three samples acquired in some scene matched. The right diagram of FIG. 8 illustrates that the nucleic acid profile of one sample did not match the other two.

The result of the electrophoresis can be obtained, for example, by the operation described with reference to FIGS. 6A and 6B. That is, with respect to the three samples acquired in some scene, operations such as mixing and reaction with a reagent is performed in the microchannel 401 to prepare droplets to be analyzed, and each is introduced into the well 413. After that, the capillary 41 is inserted into the well 413 and a voltage is applied to both ends of each capillary 41 to electrophore the droplet in the capillary 41 to obtain a nucleic acid profile of the sample. As described above, in the droplet transport device 400, since the inner wall surface of the well 413 is water-repellent and the pull-in electrode 430 is provided close to the well 413, all of the droplet can be introduced into the well 413. As a result, even when only a very small amount of sample can be obtained, it can be introduced into the capillary 41 (analysis device 40), and thus, the accuracy of analysis can be ensured. Further, by providing a plurality of wells 413, analysis of a plurality of samples can be performed at the same time, so that the analysis result can be obtained quickly.

[Modification]

The present disclosure is not limited to the above-described embodiments and includes various modifications. For example, the above-described embodiments have been described in detail in order to explain the present disclosure in an easy-to-understand manner and does not necessarily include all of the configurations described. In addition, a part of one embodiment can be replaced with the configuration of another embodiment. It is also possible to add the configuration of another embodiment to the configuration of one embodiment. It is also possible to add, delete, or replace a part of the configuration of another embodiment with respect to apart of the configuration of each embodiment.

REFERENCE SIGNS LIST

100 to 400 . . . droplet transport device
101, 201*a*, 201*b*, 301*a*, 301*b*, 401 . . . microchannel
102 . . . lower layer
202, 302 . . . bottom layer
111, 211*a*, 211*b*, 311*a*, 311*b*, 411 . . . EWOD substrate
112, 212, 312, 412 . . . upper substrate
320 . . . operation unit
330, 333, 430 . . . pull-in electrode
340, 440 . . . transport control electrode
331 . . . contact switch
332 . . . power supply
350, 450 . . . water-repellent film
460 . . . dielectric layer
431, 46 . . . cutoff switch
432, 47 . . . power supply

The invention claimed is:

1. An analysis method comprising:

preparing a droplet transport device comprising arranging a first substrate and second substrate, wherein the second substrate is an Electro Wetting On Dielectric (EWOD) substrate having an upper surface and a lower surface, such that the first substrate and the upper surface of the second substrate face each other to form an upper layer comprising a microchannel;

arranging a plurality of water-repellent treated through-holes or recesses in the second substrate above a corresponding plurality of sensors arranged as a 2×2 sensor array in an analysis device;

arranging the analysis device at a position which faces the lower surface of the second substrate and such that the analysis device is spaced apart from the lower surface of the second substrate to form a lower layer through which a plurality of droplets can be supplied from the plurality of through-holes or recesses to the corresponding plurality of sensors; and applying a water-repellent treatment to a dielectric layer covering the upper and lower surfaces of the second substrate;

supplying the plurality of droplets to the corresponding plurality of sensors via the plurality of through-holes or recesses using EWOD by applying a voltage to transport the plurality of droplets along the second substrate and to introduce the plurality of droplets into the plurality of through-holes or recesses; and simultaneously analyzing each of the plurality of droplets using the corresponding plurality of sensors, wherein the plurality of sensors arranged as the 2×2 sensor array in the analysis device and the analysis device are disposed completely below the lower surface of the second substrate.

2. The analysis method according to claim 1, further comprising:

switching between an application and a stop of the voltage by stopping the application of the voltage after applying the voltage for a certain period of time.

* * * * *